(12) United States Patent
Kim et al.

(10) Patent No.: US 12,341,236 B2
(45) Date of Patent: Jun. 24, 2025

(54) ANTENNA DEVICE HAVING MULTI-STAGE DECOUPLING NETWORK CIRCUIT

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Dongkyu Kim, Seoul (KR); Byung-Wook Min, Seoul (KR); Kyutae Park, Seoul (KR); Donghyun Lee, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 327 days.

(21) Appl. No.: 17/753,171

(22) PCT Filed: Aug. 23, 2019

(86) PCT No.: PCT/KR2019/010810
§ 371 (c)(1),
(2) Date: Feb. 22, 2022

(87) PCT Pub. No.: WO2021/040062
PCT Pub. Date: Mar. 4, 2021

(65) Prior Publication Data
US 2022/0278440 A1    Sep. 1, 2022

(51) Int. Cl.
*H01Q 1/24* (2006.01)
*H01Q 1/52* (2006.01)
*H01Q 5/50* (2015.01)

(52) U.S. Cl.
CPC .............. *H01Q 1/243* (2013.01); *H01Q 1/52* (2013.01); *H01Q 5/50* (2015.01)

(58) Field of Classification Search
CPC ............ H01Q 1/243; H01Q 1/52; H01Q 5/50; H01Q 1/521; H01Q 21/0006; H01Q 21/28;
(Continued)

(56) References Cited

U.S. PATENT DOCUMENTS 8,055,216 B2    11/2011   Dent
9,306,280 B2 *   4/2016   Kodama ................ H01Q 21/28
(Continued)

FOREIGN PATENT DOCUMENTS

WO    2015-116253    8/2015
WO    2019-077122    4/2019

OTHER PUBLICATIONS

European Patent Office Application Serial No. 19943481.2, extended Search Report dated Mar. 28, 2023, 11 pages.
(Continued)

*Primary Examiner* — Jinsong Hu
*Assistant Examiner* — Rui M Hu
(74) *Attorney, Agent, or Firm* — LEE, HONG, DEGERMAN, KANG & WAIMEY

(57) ABSTRACT

An antenna device comprises: a first antenna; a second antenna; and a plurality of single decoupling network circuits DN_1-DN_n which electromagnetically connect the first antenna and second antenna and remove a self-interference signal, wherein a multi-stage decoupling network circuit in which the DN_1-DN_n are dependent-connected can be configured such that a Y21 parameter of the multi-stage decoupling network circuit becomes equal to or lower than a predetermined value on frequencies f_1-f_n, respectively.

10 Claims, 25 Drawing Sheets

(58) Field of Classification Search
CPC ........ H01Q 1/241; H01Q 1/24; H04B 1/0458; H04B 1/18; H04B 1/525
See application file for complete search history.

(56) References Cited

U.S. PATENT DOCUMENTS

| | | | | |
|---|---|---|---|---|
| 9,600,605 | B2* | 3/2017 | Yamagajo | .............. H01Q 1/243 |
| 2003/0043887 | A1* | 3/2003 | Hudson | ............. H04L 25/03159 |
| | | | | 375/144 |
| 2006/0281426 | A1 | 12/2006 | Galan | |
| 2009/0219213 | A1* | 9/2009 | Lee | ........................ H01Q 1/521 |
| | | | | 343/700 MS |
| 2010/0248651 | A1* | 9/2010 | Dent | ...................... H04B 17/14 |
| | | | | 455/101 |
| 2014/0152523 | A1* | 6/2014 | Wu | ........................ H01Q 1/523 |
| | | | | 343/841 |
| 2014/0159986 | A1* | 6/2014 | De Luis | ................. H01Q 1/521 |
| | | | | 343/852 |
| 2016/0006119 | A1* | 1/2016 | Wu | ........................ H01Q 1/523 |
| | | | | 343/853 |
| 2018/0227005 | A1 | 8/2018 | Moher | |
| 2018/0309464 | A1 | 10/2018 | Mandegaran | |
| 2020/0244301 | A1* | 7/2020 | Askar | ...................... H04B 1/40 |
| 2021/0359407 | A1* | 11/2021 | Xiao | ........................ H01Q 5/48 |
| 2021/0367356 | A1* | 11/2021 | Nishimoto | .............. H01Q 1/52 |

OTHER PUBLICATIONS

Lin et al., "Novel Dual-Band Decoupling Network for Two-Element Closely Spaced Array Using Synthesized Microstrip Lines," IEEE Transactions on Antennas and Propagation, vol. 60, No. 11, XP011471383, Nov. 2012, 11 pages.
Sui et al., "A General T-Stub Circuit for Decoupling of Two Dual-Band Antennas," IEEE Transactions on Microwave Theory and Techniques, vol. 65, No. 6, XP011651214, Jun. 2017, 11 pages.
Askar et al., "Decoupling-Based Self-Interference Cancellation in MIMO Full-Duplex Wireless Transceivers," IEEE International Conference on Communications Workshops (ICC Workshops), XP033369950, May 2018, 6 pages.
PCT International Application No. PCT/KR2019/010810, International Search Report dated May 21, 2020, 3 pages.
Venkatasubramanian, "Antenna design and channel modelling for in-band full-duplex radios," Oct. 2018, 82 pages.
Korean Intellectual Property Office Application No. 10-2022-7007406, Notice of Allowance dated May 16, 2024, 8 pages.
Lin et al., "Nover Dual-Band Decoupling Network for Two-Element Closely Spaced Array Using Synthesized Microstrip Lines", IEEE Transactions on Antennas and Propagation, vol. 60, No. 11, Nov. 2012, 11 pages.

* cited by examiner (a)

(b)

(a)

+

(b)

=

(c)

ANTENNA DEVICE HAVING MULTI-STAGE DECOUPLING NETWORK CIRCUIT

CROSS-REFERENCE TO RELATED APPLICATIONS

This application is the National Stage filing under 35 U.S.C. 371 of International Application No. PCT/KR2019/010810, filed on Aug. 23, 2019, the contents of which is hereby incorporated by reference herein in its entirety.

TECHNICAL FIELD

The present disclosure relates to wireless communication, and more particularly to an antenna device having a multi-stage decoupling network circuit for canceling a self-interference signal in a full duplex radio (FDR) system.

BACKGROUND ART

The full duplex radio (FDR) technology is a technology for theoretically doubling a capacity of a system compared with conventional half-duplex communication for dividing a time resource or a frequency resource to be orthogonal to each other by performing transmission and reception at the same time in one node.

FIG. 1 shows the conceptual diagram of a user equipment and base station supportive of FDR.

In the FDR situation shown in FIG. 1, total three types of interferences exist as follows.

Intra-device self-interference: As transmission and reception are performed with the same time and frequency resources, a signal transmitted by a device itself is simultaneously received as well as a desired signal. In this case, as the signal transmitted by the device itself barely has attenuation and is received by a Rx antenna of its own, it is received with power much greater than that of the desired signal, which means that it works as interference.

UE to UE inter-link interference: A UL signal transmitted by a UE is received by an adjacently located UE, thereby working as interference.

BS to BS inter-link interference: A signal transmitted between base stations or heterogeneous base stations (Picocell, femtocell, relay node) in HetNet situation is received by an Rx antenna of another base station, thereby working as interference.

Intra-device self-interference (hereinafter self-interference (SI)) among the above three types of interference occurs only in a FDR system, largely degrades performance of the FDR system, and is the first problem to be solved to operate the FDR system.

DISCLOSURE

Technical Problem

A technical object of an embodiment of the present disclosure is to provide an antenna device for canceling a self-interference signal.

A technical object of an embodiment of the present disclosure is to provide an antenna device having isolation in a broadband.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, an antenna includes a first antenna, a second antenna, and a plurality of single decoupling network circuits DN_1 to DN_n for electromagnetically connecting the first antenna and the second antenna to cancel a self-interference signal, wherein the DN_1 is connected to a first antenna module for the first antenna and a second antenna module for the second antenna, the DN_n is connected to a first antenna port for the first antenna and a second antenna port for the second antenna, the DN_1 to DN_n are cascaded with each other to form a multi-stage decoupling network circuit, and the multi-stage decoupling network circuit is set to make a Y21 parameter be equal to or less than a constant value at each of frequencies f_1 to f_n.

The DN_i (i=1, . . . , and n) may include a first node, a second node connected to the first node through a first transmission line A1_i, a third node, and a fourth node connected to the third node through a second transmission line A2_i, wherein the second node and the fourth node are connected through a third transmission line including a decoupling circuit D1_i.

The first node of the DN_j+1 may be connected to the second node of the DN_j, and the third node of the DN_j+1 may be connected to the fourth node of the DN_j, where j=1, . . . , and n−1.

The A1_i and the A2_i may be set to make a real component of a Y21 parameter of the circuit in which the DN_1 to DN_i are cascaded at the frequency f_i be equal to or less than a first constant value.

The D1_i may be set to make an imaginary component of a Y21 parameter of the circuit in which the DN_1 to DN_i are cascaded in frequencies f_1 to f_i be equal to or less than a second constant value.

The Y21 parameter may be measured based on a 2 port circuit with a first port as the first antenna port and a second port as the second antenna port.

The decoupling circuit may be formed in a T-shaped structure.

The decoupling circuit may include a coupler.

The DN_i (i=1, . . . , and n) may further include a first shunt stub having one end connected to the second node and a remaining end grounded, and a second shunt stub having one end connected to the fourth node and a remaining end grounded.

Advantageous Effects

According to an embodiment of the present disclosure, a self-interference signal may be effectively canceled by increasing isolation between antennas in a full duplex radio (FDR) system.

According to an embodiment of the present disclosure, an antenna device may have isolation in a broadband.

It will be appreciated by persons skilled in the art that that the effects that can be achieved through the embodiments of the present disclosure are not limited to those described above and other advantageous effects of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

BEST MODE

Reference will now be made in detail to the exemplary embodiments of the present disclosure with reference to the accompanying drawings. The detailed description, which will be given below with reference to the accompanying drawings, is intended to explain exemplary embodiments of the present disclosure, rather than to show the only embodiments that may be implemented according to the present disclosure.

The following detailed description includes specific details in order to provide a thorough understanding of the present disclosure. However, it will be apparent to those skilled in the art that the present disclosure may be practiced without such specific details.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

Moreover, in the following description, specific terminologies are provided to help the understanding of the present disclosure. And, the use of the specific terminology can be modified into another form within the scope of the technical idea of the present disclosure.

The description, functions, procedures, proposals, methods, and/or operational flowcharts disclosed in the present disclosure may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 1:
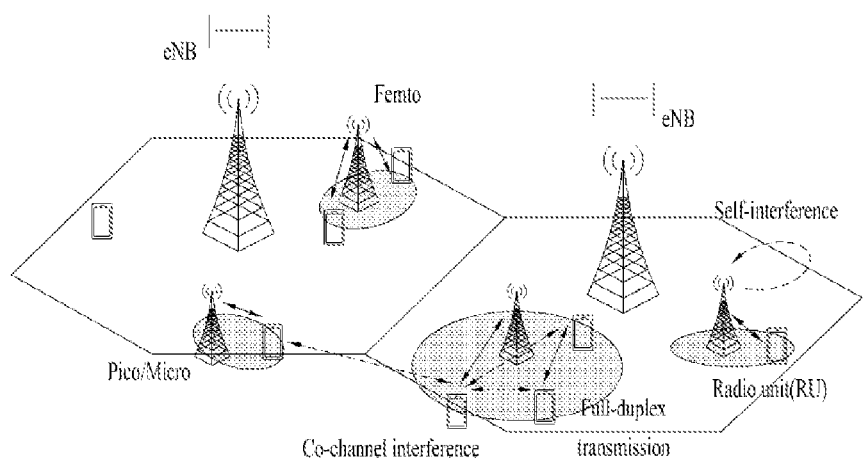
FIG. 1 shows the conceptual diagram of a user equipment and base station supportive of FDR.
Figure 2:
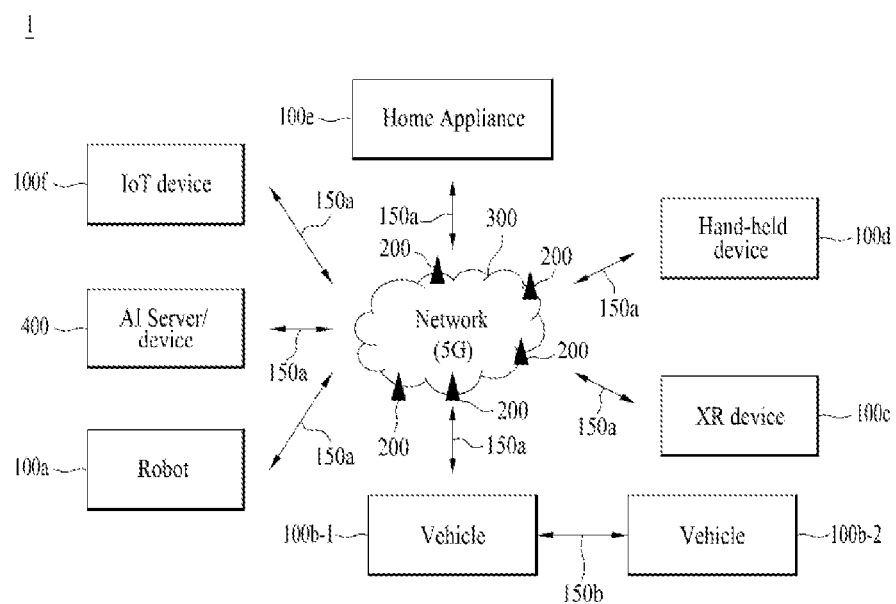
FIG. 2 illustrates a communication system applied to the present disclosure.

FIG. 2 illustrates a communication system applied to the present disclosure.

Referring to FIG. 2, a communication system 1 applied to the present disclosure includes wireless devices, BSs, and a network. Here, the wireless devices represent devices performing communication using RAT (e.g., 5G NR) or LTE) and may be referred to as communication/radio/5G devices. The wireless devices may include, without being limited to, a robot 100a, vehicles 100b-1 and 100b-2, an extended reality (XR) device 100c, a handheld device 100d, a home appliance 100e, an Internet of things (IoT) device 100f, and an artificial intelligence (AI) device/server 400. For example, the vehicles may include a vehicle having a wireless communication function, a self-driving vehicle, and a vehicle capable of performing vehicle-to-vehicle communication. The vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, digital signage, a vehicle, a robot, etc. The handheld device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smart meter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). In addition, the IoT device 100f (e.g., a sensor) may perform direct communication with other IoT devices (e.g., sensors) or other wireless devices 100a to 100f.

Wireless communication/connections 150a, 150b, and 150c may be established between the wireless devices 100a to 100f and the BSs 200, between wireless devices 100a to 100f, and between the BSs 200, respectively. Here, the wireless communication/connections may be established using various RATs (e.g., 5G NR) such as UL/DL communication 150a, sidelink communication 150b (or D2D communication), and communication 15c between the BSs (e.g., a relay or integrated access backhaul (IAB)). The wireless devices and the BSs, the wireless device and the wireless device, and the BS and the BS may transmit/receive radio signals to/from each other through the wireless communication/connections 150a, 150b, and 150c. For example, the wireless communication/connections 150a, 150b, and 150c may transmit/receive signals through various physical channels. To this end, at least a part of various configuration information configuring processes, various signal processing processes (e.g., channel encoding/decoding, modulation/demodulation, and resource mapping/demapping), and various resource allocation processes, for transmitting/receiving radio signals, may be performed based on the various proposals of the present disclosure.

Figure 3:
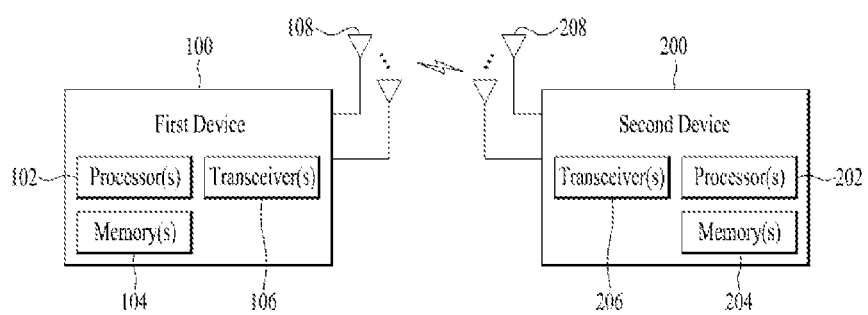
FIG. 3 illustrates wireless devices applicable to the present disclosure.

FIG. 3 illustrates wireless devices applicable to the present disclosure.

Referring to FIG. 3, a first wireless device 100 and a second wireless device 200 may transmit and receive signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 2.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the description, functions, procedures, proposals, methods, and/or operational flowcharts disclosed in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or the entirety of processes controlled by the processor(s) 102 or store software code including instructions for performing the description, functions, procedures, proposals, methods, and/or operational flowcharts disclosed in the present disclosure. Here, the processor(s) 102 and the memory(s) 104 may be a part of a communication modem/circuit/chipset designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with RF unit(s). In the present disclosure, the wireless device may represent the communication modem/circuit/chip set.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the description, functions, procedures, proposals, methods, and/or operational flowcharts disclosed in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or the entirety of processes controlled by the processor(s) 202 or store software code including instructions for performing the description, functions, procedures, proposals, methods, and/or operation flowcharts disclosed in the present disclosure. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent the communication modem/circuit/chipset.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the description, functions, procedures, proposals, methods, and/or operational flowcharts disclosed in the present disclosure. The one or more processors 102 and 202 may generate messages, control information, data, or information according to the description, functions, procedures, proposals, methods, and/or operational flowcharts disclosed in the present disclosure. The one or more processors 102 and 202 may generate signals (e.g., baseband signals) including PDUs, SDUs, messages, control information, data, or information according to the description, functions, procedures, proposals, methods, and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the description, functions, procedures, proposals, methods, and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The description, functions, procedures, proposals, methods, and/or operational flowcharts disclosed in the present disclosure may be implemented using firmware or software, and the firmware or software may be configured to include the modules, procedures, or functions. Firmware or software configured to perform the description, functions, procedures, proposals, methods, and/or operational flowcharts disclosed in the present disclosure may be included in the one or more processors 102 and 202 or stored in the one or more memories 104 and 204 so as to be driven by the one or more processors 102 and 202. The description, functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured as read-only memories (ROMs), random access memories (RAMs), electrically erasable programmable read-only memories (EPROMs), flash memories, hard drives, registers, cache memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the description, functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the description, functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 4:
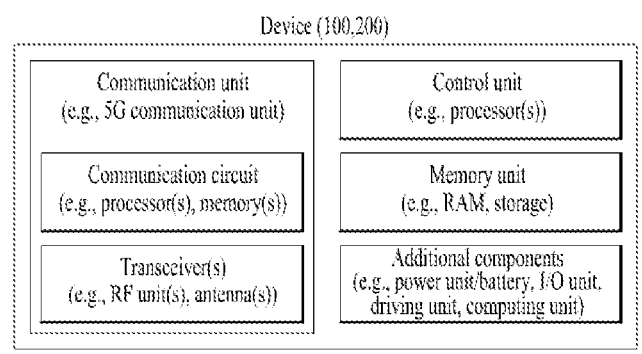
FIG. 4 illustrates another example of a wireless device applied to the present disclosure.

FIG. 4 illustrates another example of a wireless device applied to the present disclosure. The wireless device may be implemented in various forms according to use cases/services (see FIG. 2).

Figure 23:
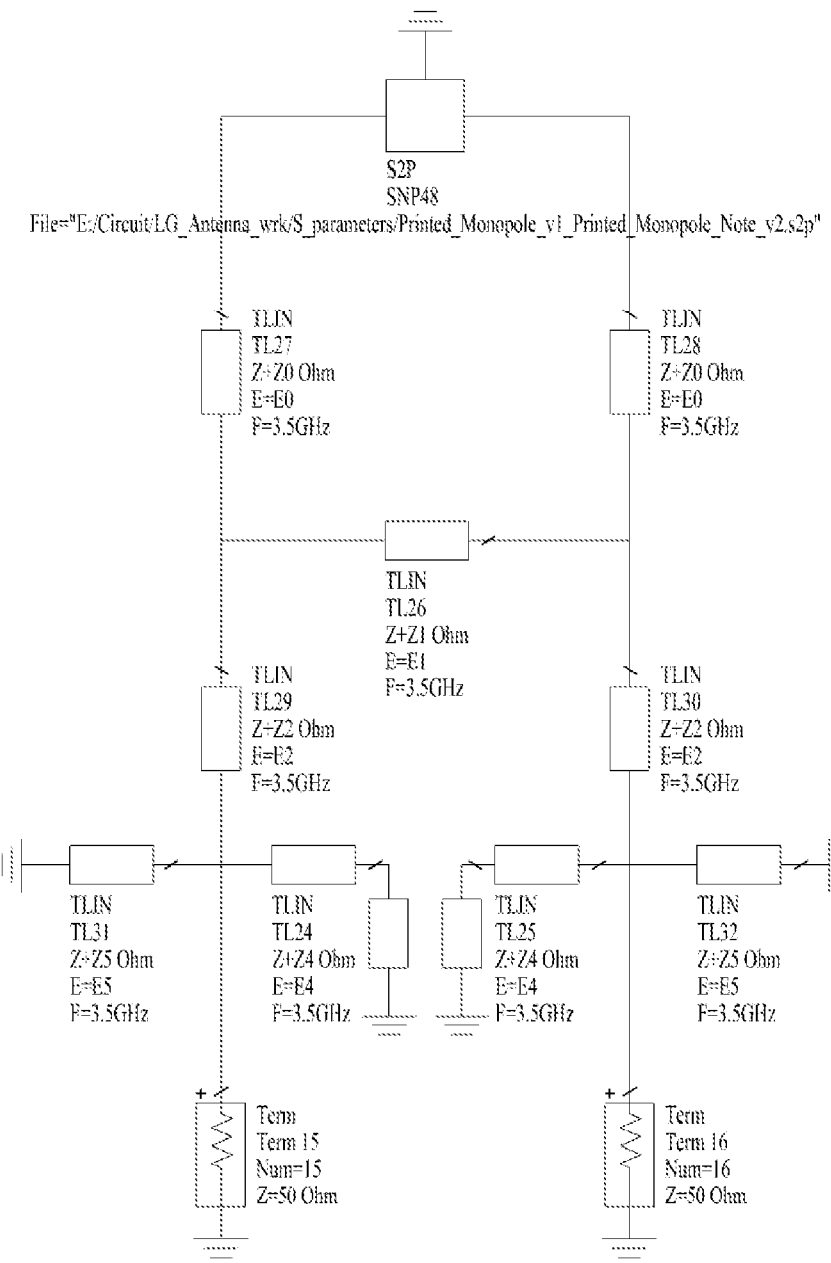
Figure 24:
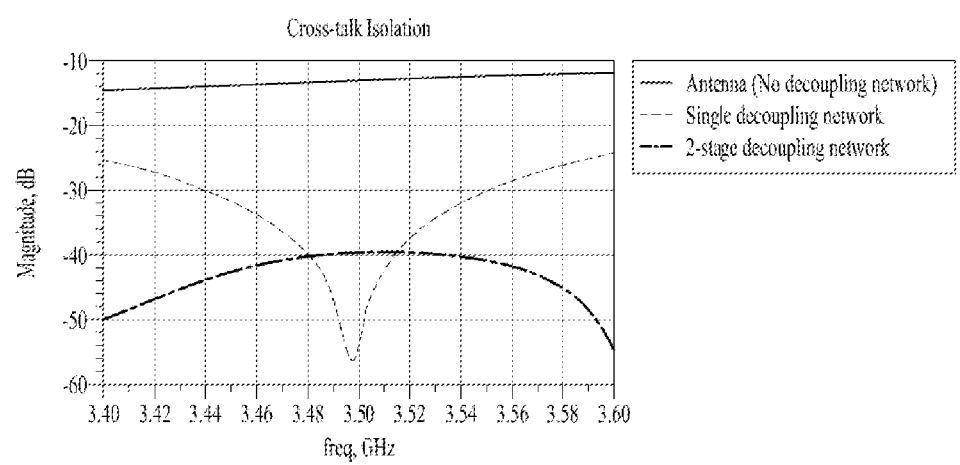
FIG. 24 is a diagram showing an example of an isolation graph depending on a frequency based on an antenna device according to an embodiment of the present disclosure.

Referring to FIG. 24, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, an input/output (I/O) unit, a driving unit, and a computing unit. The wireless device may be implemented in the form of, without being limited to, the robot (100a of FIG. W1), the vehicles (100b-1 and 100b-2 of FIG. 22), the XR device (100c of FIG. 22), the handheld device (100d of FIG. 22), the home appliance (100e of FIG. 22), the IoT device (100f of FIG. 22), a digital broadcast terminal, a holographic device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use case/service.

In FIG. 4, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphics processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Figure 5:
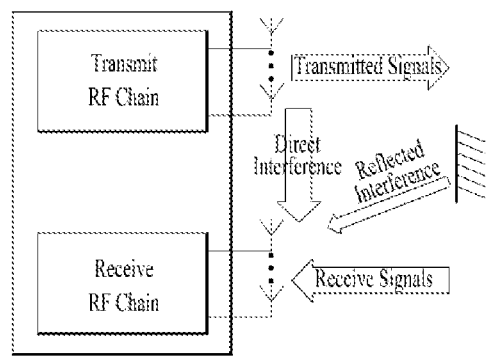
FIG. 5 is a conceptual diagram exemplarily showing Tx/Rx link and Self-Interference (SI) in FDR communication situation.

FIG. 5 is a conceptual diagram exemplarily showing Tx/Rx link and Self-Interference (SI) in FDR communication situation.

As shown in FIG. 5, Self-Interference (SI) may be categorized into direct interference that a signal transmitted from a Tx antenna directly enters an Rx antenna of its own without path attenuation and reflected interference that the signal is reflected by the surrounding terrain. And, a size of the SI is extremely larger than that of a desired signal due to a physical distance difference. Due to the intensity of the extremely large interference, effective cancellation of self-interference is required for the drive of FDR system.

In order to effectively drive the FDR system, requirements of Self-Interference Cancellation (Self-IC) according to maximum transmission power of a device may be determined as Table 1 (Self-IC requirements (BW=20 MHz) up FDR application in a mobile communication system).

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | -101 dBm | 5 dB (for eNB) | -96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | -92 dBm | 115 dB |

Referring to Table 1, it can be observed that Self-IC performance of 119 dBm is necessary in order for a User Equipment (UE) to effectively drive an FDR system on a BandWidth (BW) of 20 MHz. A thermal noise value may change into $N_{0,BW}$=-174 dBm+10×$\log_{10}$(BW) depending on a bandwidth of a mobile communication and Table 7 was found on the asumption of a bandwidth of 20 MHz. Regarding Table 7, Receiver Noise Figure (NF) considers a worst case by referring to 3GPP specification requirements. A receiver thermal noise level is determined as a sum of ternmal noise and receiver NF on a specific BW.

Figure 6:
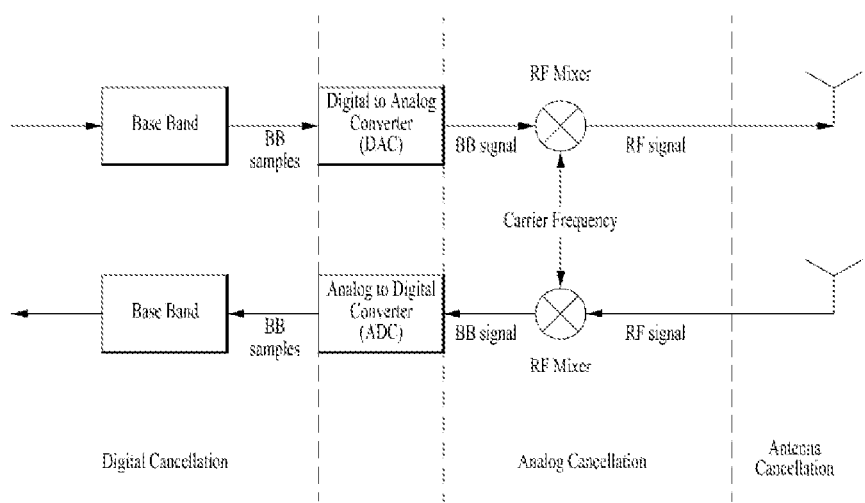
FIG. 6 is a diagram showing positions for applying there kinds of interference schemes in an RF Tx/Rx stage (or RF front stage) of a device.

Types of Self-Interference Cancellation (Self-IC) Schemes and Application Methods FIG. 6 is a diagram showing positions for applying there kinds of interference schemes in an RF Tx/Rx stage (or RF front stage) of a device. In FIG. 6, application positions of three kinds of Self-IC schemes are illustrated. Hereinafter, the three kinds of Self-IC schemes are schematically described.

Antenna Self-IC: a Self-IC scheme supposed to be executed most preferentially among all Self-IC schemes is an antenna Self-IC scheme. SI cancellation is performed in an antenna stage. Most simply, a portion of an SI signal can be cancelled in a manner of physically cutting off a transfer of the SI signal by installing an object capable of cutting off a signal between a Tx antenna and an Rx antenna, artificially adjusting an inter-antenna distance by utilizing multiple antennas, or giving phase inversion to a specific Tx signal. Moreover, a portion of an SI signal may be cancelled by utilizing multiple polarized antennas or a directional antenna.

Analog Self-IC: This is a scheme of cancelling an SI signal using an analog signal copied by a scheme of cancelling interference in an analog stage before a received signal passes through Analog-to-Digital Converter (ADC). This may be performed in an RF or IF region. A method of cancelling an SI signal is described in detail as follows. First of all, a copy signal of an actually received SI signal is generated in a manner of time-delaying a transmitted analog signal and then adjusting an amplitude and phase of the signal and then subtracted from a signal received through an RX antenna. Yet, since it is processed using the analog signal, additional distortion may occur due to implementation complexity and circuit characteristics, which is disadvantageous in that interference cancellation performance may be changed considerably.

Digital Self-IC: This is a scheme of cancelling interference after a received signal has passed through ADC and includes all interference cancellation schemes performed in a baseband region. Most simply, it can be implemented in a manner of making a copy signal of SI using a transmitted digital signal and then subtracting it from a received digital signal. Alternatively, schemes for preventing a transmitted signal of a UE or BS from being received through an Rx antenna in a manner of performing precoding/postcoding on a baseband using multiple antennas may be classified as Digital Self-IC. However, Digital Self-IC is possible if a digitally modulated signal is quantized enough to reconstruct information on a desired signal. Thus, in order to perform Digital Self-IC, it is necessary to premise condition that a signal power level difference between an interference signal, which remains after cancelling interference using at least one of the above schemes, and a desired signal should enter an ADC range.

Figure 7:
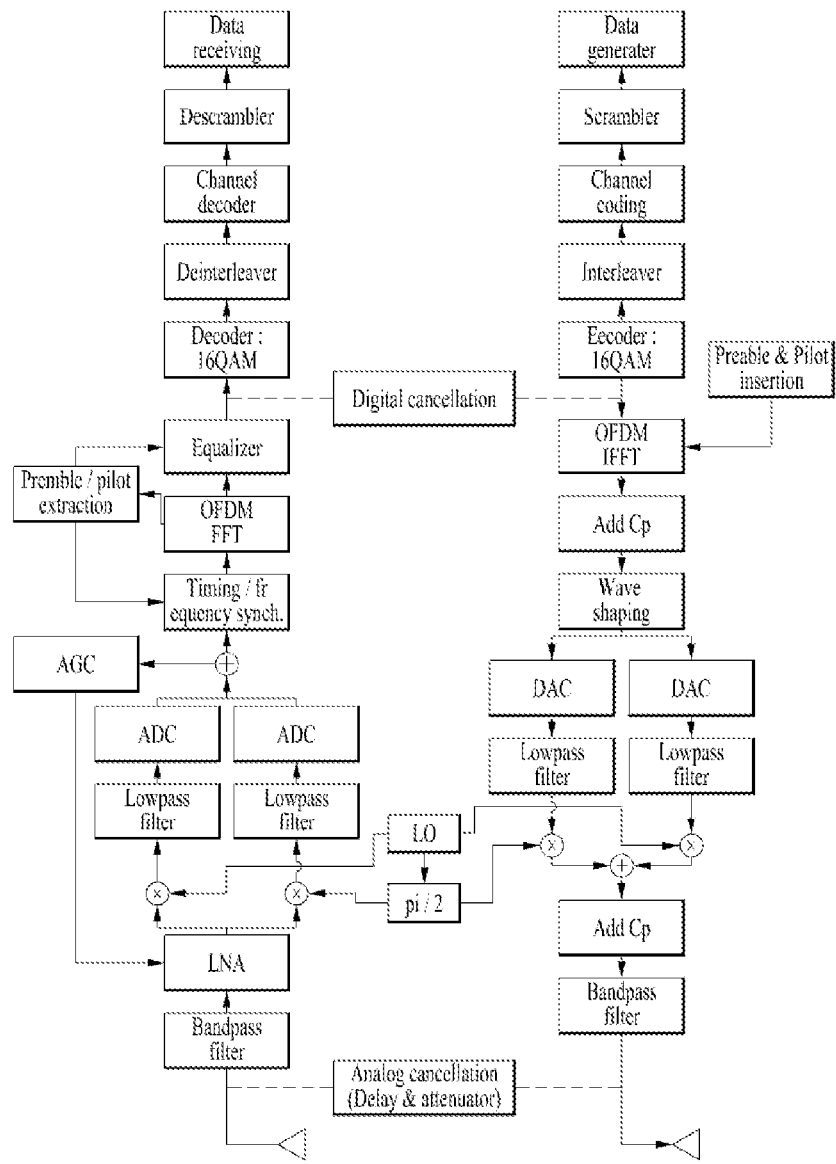
FIG. 7 is a block diagram diagrammatizing a device for Self-Interference Clearance (Self-IC) in a communication device proposed in a communication system environment using OFDM based on FIG. 6.

FIG. 7 is a block diagram diagrammatizing a device for Self-Interference Cancellation (Self-IC) in a communication device proposed in a communication system environment using OFDM based on FIG. 6.

Regarding a location of a Digital Self-IC block, although FIG. 7 shows that it is performed directly using digital SI signal information before DAC and digital SI signal information after ADC, it may be performed using a digital SI signal after IFFT and a digital SI signal before FFT. In addition, although FIG. 7 is the conceptual diagram showing that a SI signal is cancelled by separating a Tx antenna and an Rx antenna from each other, antenna configuration may be different that of FIG. 7 in case of using an antenna interference cancellation scheme using a single antenna.

Type of Antenna Self-Interference Cancellation (Antenna Self-IC) Scheme

In full duplex radio (FDR) before multiple-input multiple-output (MIMO), a self-interference signal may include a total of two. In more detail, the self-interference signal may include self-talk interference whereby a transmission port TX_N of an antenna N is coupled to a reception port RX_N of the antenna N, and cross-talk interference whereby TX_N is coupled to RX_M (here, N≠M).

Here, coupling refers to a phenomenon in which AC signal energy is transmitted electrically/magnetically between independent spaces or lines. That is, due to the coupling, energy may be exchanged between the transmission antenna and the reception antenna present in independent spaces to generate an interference signal.

An antenna self-interference cancellation method of the aforementioned plurality of self-interference signal cancellation methods for cancelling the self-interference signal will be described in more detail.

When a shared antenna is used for antenna self-interference cancellation, a method based on polarization of a circulator and an antenna may be used. When TX and RX use different antennas, a method of physically increasing a distance between the antennas and a decoupling network may be used.

Figure 8:
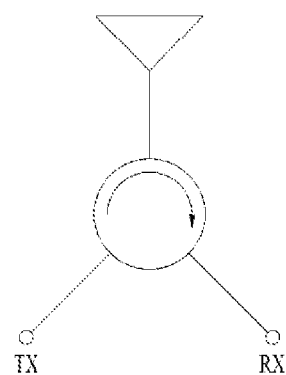
FIG. 8 is a diagram showing a method of cancelling a self-interference signal using a circulator.

FIG. 8 is a diagram showing a method of cancelling a self-interference signal using a circulator.

Referring to FIG. 8, the circulator may be connected to an antenna that simultaneously transmits and receives signals and may function to separate the transmit signal and the receive signal. Here, the circulator may be a non-reciprocal device using magnetism and may have its own isolation between ports. Thus, the circulator may cancel a self-interference signal using isolation between ports.

However, isolation of a commercial circulator is low, thus there is a limitation in sufficiently canceling a self-interference signal. This is because isolation between ports of the commercially available circulator is only about −20 dB, which is not sufficient for a self-interference signal cancelation degree required at an antenna stage. In addition, the circulator may have no performance to cancel cross-talk, which is a self-interference signal leaked from other TXs in a MIMO situation, and thus may not be capable of being applied to a MIMO communication situation.

Figure 9:
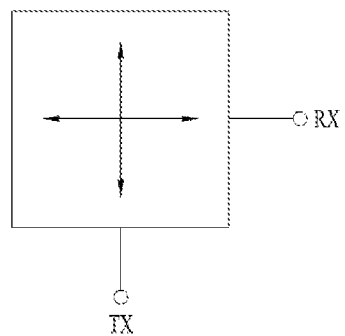
FIG. 9 is a diagram showing a method of cancelling a self-interference signal using antenna polarization.

FIG. 9 is a diagram showing a method of cancelling a self-interference signal using antenna polarization.

Referring to FIG. 9, a patch antenna may have total of 2 linear polarizations depending on a direction in which a signal is incident. In FIG. 9, a vertical arrow indicates polarization of a TX signal and a horizontal arrow indicates polarization of an RX signal. The two linear polarizations may be orthogonal to each other. Theoretically, a receiving end and a transmitting end that use orthogonal polarizations may not exchange a signal. Thus, when different linear polarizations of the patch antenna are used for the receiving end and the transmitting end, respectively, a self-interference signal may be completely cancelled.

However, when a method based on polarization isolation is used, the number of MIMO antennas may be limited by the number of polarizations of the antenna, and when a general patch antenna is used, there is a limitation in that only 2×2 MIMO communication is possible. Thus, in order to increase the number of antennas, there is a disadvantage of having to design an antenna with multiple polarizations.

Figure 10:
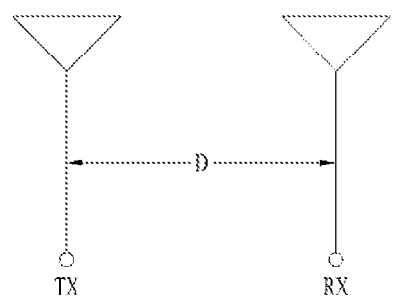
FIG. 10 is a diagram showing a method of canceling a self-interference signal based on a physical distance of antennas.

FIG. 10 is a diagram showing a method of canceling a self-interference signal based on a physical distance of antennas.

Referring to FIG. 10, a physical distance of 'D' may exist between the TX antenna and the RX antenna. Due to the physical distance, free space loss may occur in a signal coupled from the TX antenna to the RX antenna. Due to the free space loss, a signal emitted from the TX antenna is attenuated in inverse proportion to the square of a distance. Thus, the self-interference signal may be cancelled by increasing the distance between the TX antenna and the RX antenna sufficiently.

However, when a method of adjusting a physical distance between antennas is used, there is a need for a sufficient distance between the antennas in order to obtain a high self-interference signal cancelation degree. Thus, in the case of MIMO communication using multiple antennas, there is a problem that the size of an antenna module becomes excessively large.

Accordingly, the aforementioned method using a circulator, method using antenna polarization, and a method using a physical distance between antennas may not be appropriate for MIMO antenna communication.

Figure 11:
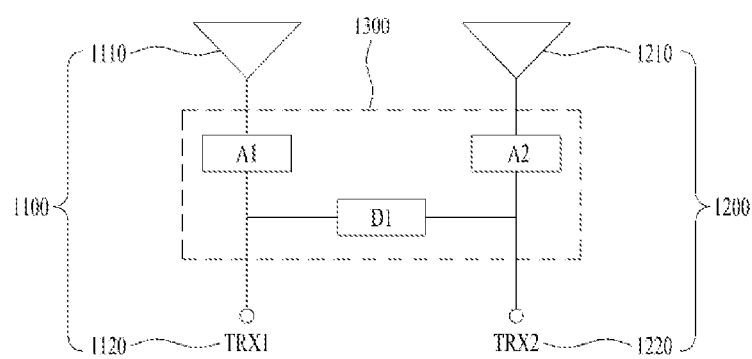
FIG. 11 is a diagram showing an example of an antenna device including a general single decoupling network circuit.
Figure 12:
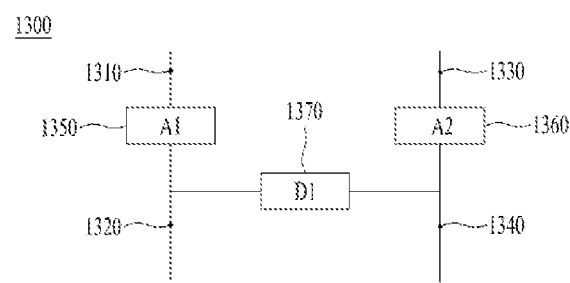
FIG. 12 is a diagram showing an example of a single decoupling network circuit.

FIG. 11 is a diagram showing an example of an antenna device including a general single decoupling network circuit. FIG. 12 is a diagram showing an example of a single decoupling network circuit.

Referring to FIG. 11, the antenna device including a general single decoupling network circuit may include a first antenna 1100, a second antenna 1200, and a single decoupling network circuit 1300. The first antenna 1100 may include a first antenna module 1110 and a first antenna port 1120. The second antenna 1200 may include a second antenna module 1210 and a second antenna port 1220. Although FIG. 11 illustrates a decoupling network circuit using two antennas, the decoupling network circuit may use, but is not limited to, a plurality of antennas.

In the antenna device, a self-interference signal may be generated by decoupling between the first antenna 1100 and the second antenna 1200. The single decoupling network circuit 1300 may electromagnetically connect the first antenna 1100 and the second antenna 1200 and function to cancel the self-interference signal.

Referring to FIG. 12, the single decoupling network circuit 1300 may include a first node 1310, a second node 1320, a third node 1330, and a fourth node 1340. The first node 1310 and the second node 1320 may be connected through a first transmission line A1, 1350. The third node 1330 and the fourth node 1340 may be connected through a second transmission line A2, 1360. The second node 1320 and the fourth node 1340 may be connected through a third transmission line.

Here, a node may refer to a point that is electrically connected to other devices or circuit elements.

The first transmission line A1, 1350 and the second transmission line A2, 1360 may have characteristic impedance. Here, the characteristic impedance may refer to a ratio of current and voltage waves that flow through each transmission line. The characteristic impedance is a resistive amount that is constantly determined according to the characteristics of a distribution medium of the transmission line and is a concept different from circuit impedance. A characteristic impedance value of each transmission line may be set to 50 ohms, but is not limited thereto and may be adjusted to various values.

The third transmission line may include a decoupling circuit 1370 including an inductor L, a capacitor C, or a combination thereof. A decoupling circuit D1 may have imaginary impedance.

Thus, the self-interference signal generated between the first antenna and the second antenna may be canceled by designing the characteristic impedance values and the electrical length of A1 and A2, and a decoupling circuit. Here, the electrical length is a concept represented as a multiple of a wavelength of a periodic electromagnetic or electrical signal propagated in a medium. In other words, the electrical length is a value obtained by dividing the physical distance by a wavelength. For example, when the wavelength is 1 cm and the physical distance of the transmission line is 10 cm, the electrical length of the transmission line may have a phase change of 10 wavelengths, i.e. 3600 degrees. When a phase of complex impedance is changed by A1 and A2, the phase may be changed by the electrical length (phase). A theoretical expression is as follows.

$$Z_{in}(\theta) = Z_0 \frac{Z_L + jZ_0 \tan(\theta)}{Z_0 + jZ_L \tan(\theta)}$$

Here, $Z_{in}$: input impedance, $Z_0$: characteristic impedance, $Z_L$: load impedance, and $\theta$: electrical length (phase).

Here, each of A1, A2, and D1 of the single decoupling network circuit may be designed using a y-parameter of a 2 port circuit.

Viewed from the antenna ports 1120 and 1220 of FIG. 11 toward the single decoupling network circuit 1300.

However, the basic structure of the single decoupling network is a resonator structure, and thus may disadvantageously have a very narrow operating frequency band. Thus, this structure may not be suitable for FDR for increasing throughput using a wide frequency band in real time.

The single decoupling network may be sensitive to process variation. The process variation may directly affect self-interference signal cancellation performance, and may form a difference equal to or greater than 5 dB. Thus, in order to overcome this, there is a need to design a decoupling network that operates in a wide operating frequency band and is less sensitive to the process variation.

Figure 13:
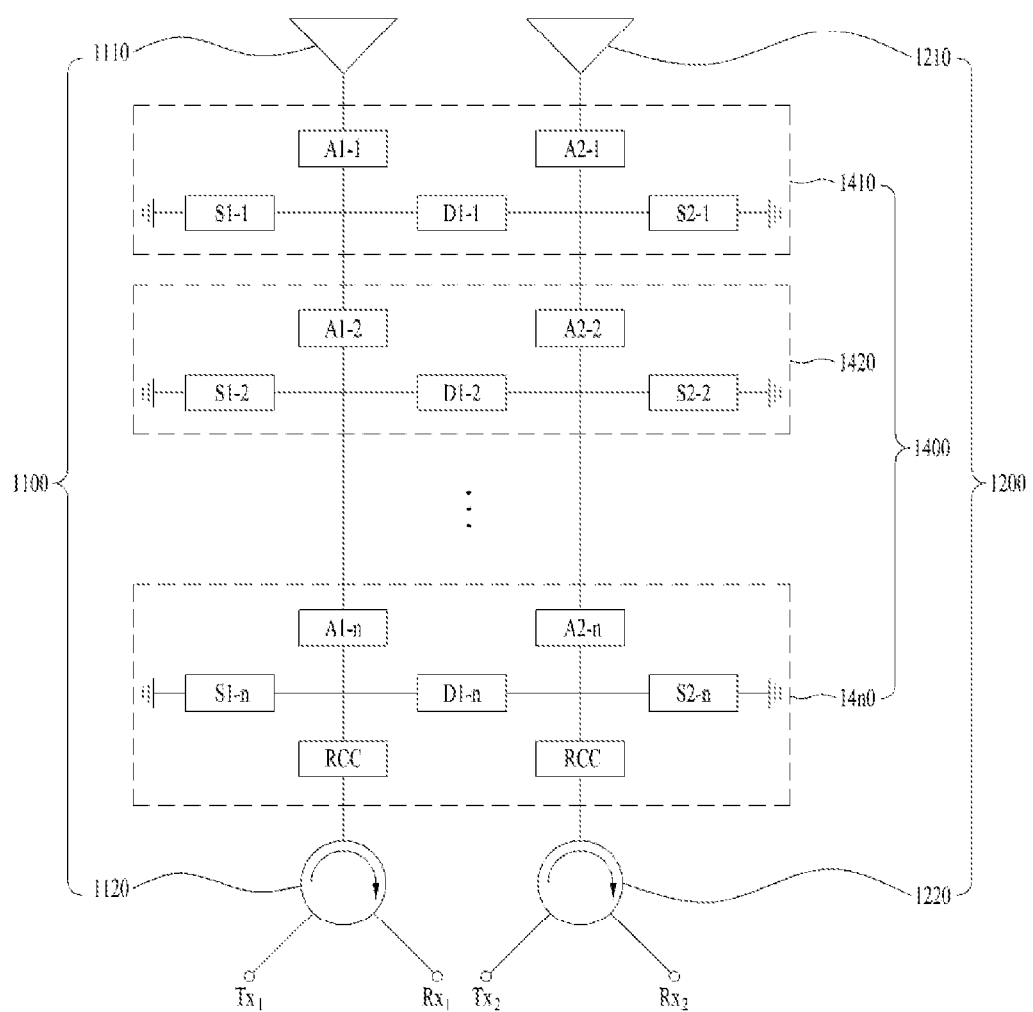
FIG. 13 is a diagram showing an example of an antenna device according to an embodiment of the present disclosure.

FIG. 13 is a diagram showing an example of an antenna device according to an embodiment of the present disclosure.

Referring to FIG. 13, the antenna device according to an embodiment of the present disclosure may include the first antenna 1100, the second antenna 1200, and a multi-stage decoupling network circuit 1400. The first antenna 1100 may include the first antenna module 1110 and the first antenna port 1120. The second antenna 1200 may include the second antenna module 1210 and the second antenna port 1220. Although FIG. 12 illustrates a multi-stage decoupling network circuit using two antennas, the multi-stage decoupling network circuit may use, but is not limited to, a plurality of antennas.

In the present disclosure, antenna devices that emit an antenna signal or receives an external wireless signal may be referred to as the antenna modules 1110 and 1210. Ports that electrically input and output a transit signal and a receive signal may be referred to as the antenna ports 1120 and 1220. The antenna port may have a structure in which an input port and an output port are separated by a circulator.

The multi-stage decoupling network circuit 1400 according to an embodiment of the present disclosure may include a plurality of single network circuits 1410, 1420, . . . , and 14n0. The multi-stage decoupling network circuit 1400 may electromagnetically connect the first antenna 1100 and the second antenna 1200 and may function to cancel a self-interference signal. Each of the single decoupling network circuits 1410, 1420, . . . , and 14n0 may have the same structure as the single decoupling network circuit 1300 of FIG. 11.

FIG. 13 is a diagram showing a circuit according to an embodiment of the present disclosure, which may be modified in various forms.

The multi-stage decoupling network circuit 1400 may include a first stage single decoupling network circuit 1410 to an $n^{th}$ stage single decoupling network circuit 14n0. The first stage single decoupling network circuit 1410 may be connected to the first antenna module 1110 and the second antenna module 1210. The $n^{th}$ stage single decoupling network circuit 14n0 may be connected to the first antenna port 1120 and the second antenna port 1220.

That is, the antenna modules 1110 and 1210, the first stage single decoupling network circuit to the $n^{th}$ stage single decoupling network circuits 1410, 1420, . . . , and 14n0, and the antenna ports 1120 and 1220 may be sequentially cascaded.

Figure 14:
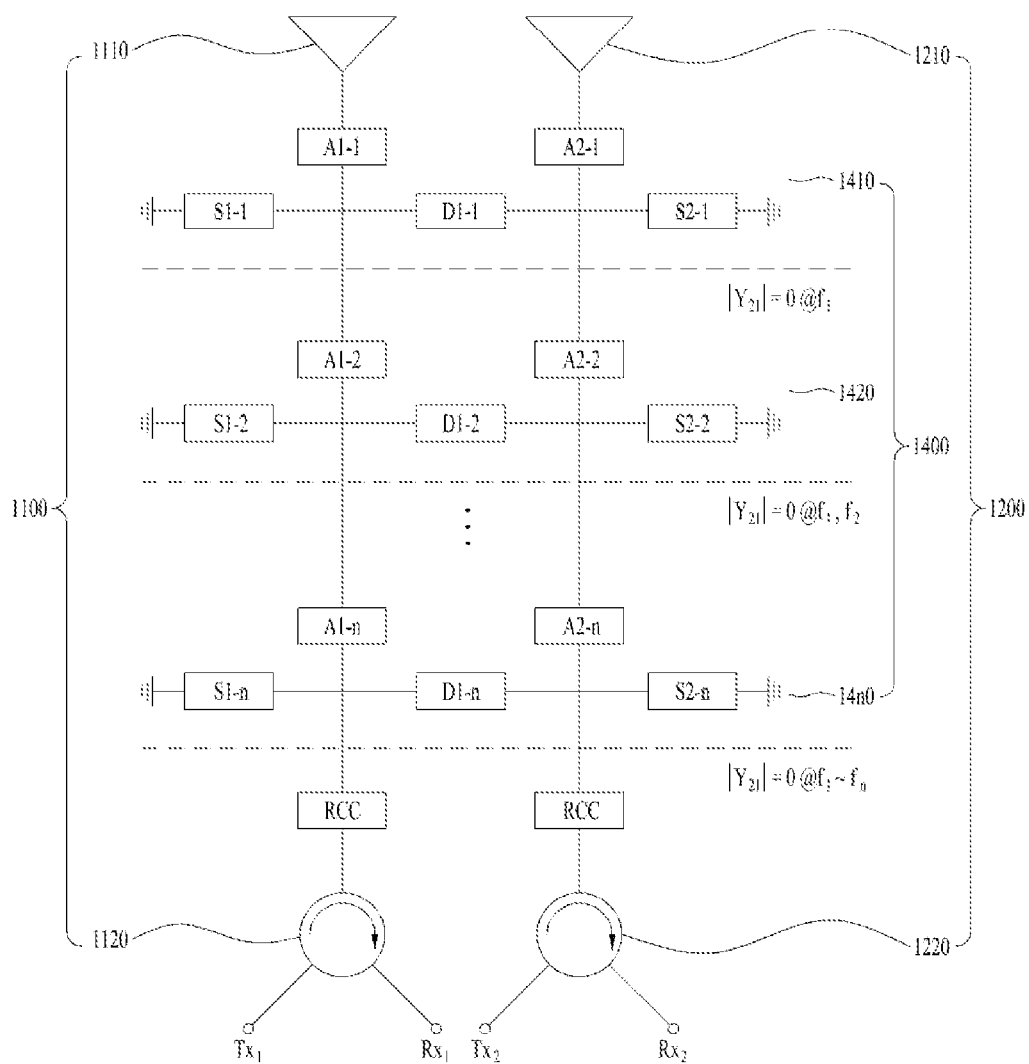
FIG. 14 is a diagram for explaining a method of designing each single decoupling network circuit according to an embodiment of the present disclosure.

FIG. 14 is a diagram for explaining a method of designing each single decoupling network circuit according to an embodiment of the present disclosure.

Referring to FIGS. 14, A1, A2, and D1 may be designed by changing a frequency while sequentially cascading each single decoupling network circuit.

For example, an antenna device to which the first stage single decoupling network circuit 1410 is connected may be assumed to operate at a frequency of f_1.

Here, a 2-port circuit in which a first antenna port is set to port 1 and a second antenna port is set to port 2 may be assumed.

Here, a Y-parameter of the 2-port circuit may be represented as follows.

$$\begin{bmatrix} I1 \\ I2 \end{bmatrix} = \begin{bmatrix} Y11 & Y12 \\ Y21 & Y22 \end{bmatrix} \begin{bmatrix} V1 \\ V2 \end{bmatrix}$$

V1 may be a voltage input to port 1, and I1 may be current input to port 1. V2 may be a voltage input to port 2, and I1 may be current input to port 2.

Y21 may be a ratio $$(Y_{21}|_{V_2=0} = \frac{I_2}{V_1})$$

of current and a test signal voltage in port 2 when port 2 is shorted and a test voltage is applied to port 1. When coupling is present between two antennas, Y21 may have a value that is not 0.

Coupling between antennas may be generally modeled as an ideal capacitor. Thus, an inductor having opposite characteristic to a capacitor may be added to the decoupling network, and the size of Y21 may be close to zero.

The way to understand this physically is to think of a decoupling network and an antenna as one LC parallel resonator. That is, the decoupling network may make the antenna and the decoupling network operate together as a parallel resonator having the characteristic of a band stop at a specific frequency f_1 for two ports of the antenna.

Thus, A1_1, A2_1, and D1_1 of the first stage single decoupling network circuit 1410 may be adjusted to make a value of Y21 parameter at the specific frequency f_1 be equal to or less than a constant value z.

For example the characteristic impedance and the electrical length of the transmission lines A1_1 and A2_1 of the first stage single decoupling network circuit 1410 may be adjusted to make a real value of Y21 at the specific frequency f_1 be equal to or less than a first constant value x. In order to maintain impedance matching, characteristic impedance of 50 ohms is generally used. In addition, impedance of D1_1 may be adjusted to make an imaginary value of Y21 in a specific frequency range be equal to or less than a second constant value y.

Here, a value of Y21 parameter at f_1 may be represented as z=abs(x+jy).

Here, the constant value, the first constant value, and the second constant value may be set to various values, and the constant value may also refer to 0.

In other words, A1, A2, and D1 of the decoupling network may be adjusted to make the size of Y21 of a reference plane be close to zero, and thus coupling between antennas may be removed to increase antenna isolation to 30 dB or more. When the size of Y21 is made to 0, this may mean that current does not flow in port 2. This may be equivalent to infinite resistance between port 1 and port 2, which may be understood as the state in which the two ports are completely separated and are not connected at all, that is, an open state.

Thus, an antenna device to which the first stage single decoupling network circuit is connected may ensure isolation at a specific frequency f_1.

Next, a structure in which the second stage single decoupling network circuit is cascaded to the first stage single decoupling network circuit may be assumed.

A specific frequency f_2 may be applied to an antenna device to which the first stage single decoupling network circuit 1410 and the second stage single decoupling network circuit 1420 are connected. In this case, f_1<f_2 may be satisfied.

A value of a Y21 parameter of the antenna device may be measured, and devices values of the second stage single decoupling network circuit may be adjusted/set to make a value of a Y21 parameter at a frequency f_2 be equal to or less than a constant value.

Here, the electrical length of A1_2 and A2_2 of the second stage single decoupling network circuit may be adjusted to set a real component of the Y21 parameter of the circuit in which the first stage and second stage single decoupling network circuits are cascaded to be equal to or less than the first constant value. Even if f_1 is applied to a circuit in which the first stage and second stage single decoupling network circuits are cascaded, a real component of Y21 may be still equal to or less than the first constant value. In addition, an impedance value of D1_2 of the second stage single decoupling network circuit may be set to make an imaginary component of a Y21 parameter of the circuit in which the first stage and second stage single decoupling network circuits are cascaded be equal to or less than the second constant value at f_1 to f_2.

That is, the second stage single decoupling network circuit 1420 may be designed to make a value of a Y21 parameter of a multi-stage decoupling network circuit formed by combining the first stage and second stage single decoupling network circuits be equal to or less than a constant value at f_1 and f_2.

In a subsequent operation, a multi-stage decoupling network circuit in which the third stage single decoupling network circuit 1430 is cascaded with the first stage and second stage single decoupling network circuits 1410 and 1420 may be set.

The third stage single decoupling network circuit may be designed to make a value of a Y21 parameter of the multi-stage decoupling network circuit formed by combining the first stage, second stage, and third stage single decoupling network circuits 1410, 1420, and 1430 be equal to or less than a constant value at f_1, f_2, and f_3. Here, f_1<f_2<f_3 may be satisfied.

Here, the electrical length of A1_3 and A2_3 of the third stage single decoupling network circuit may be adjusted to set a real component of the Y21 parameter of the circuit in which the first stage, second stage, and third stage single decoupling network circuits are cascaded to be equal to or less than the first constant value. Even if f_1 and f_2 are applied to a circuit in which he first stage, second stage, and third stage single decoupling network circuits are cascaded, a real component of Y21 may be still equal to or less than the first constant value. In addition, an impedance value of D1_3 of the third stage single decoupling network circuit may be set to make an imaginary component of a Y21 parameter of the circuit in which the first stage, second stage, and third stage single decoupling network circuits are cascaded be equal to or less than the second constant value at f_1 to f_3.

In the circuit in which the first stage, second stage, and third stage single decoupling network circuits 1410, 1420, and 1430 are combined, when frequencies f_1, f_2, and f_3 are each applied, a Y21 value may be measured to be equal to or less than a constant value.

Expressing this in general, the multi-stage decoupling network circuit in which DN_1 to DN_n are cascaded may be set to make a Y21 parameter be equal to or less than a constant value at frequencies f_1 to f_n. Here, i is an integer equal to or greater than 1.

A1_i and A2_i may be set to make a real component of a Y21 parameter of a the multi-stage decoupling network circuit in which DN_1 to DN_i are cascaded be equal to or less than the first constant value at a frequency f_i.

D1_i may be set to make an imaginary component of a Y21 parameter of a decoupling network circuit in which DN_1 to DN_i are cascaded be equal to or less than the second constant value at f_1 to f_i.

The electrical length of the transmission lines A1 and A2 may be adjusted to set a real component of a Y21 parameter to be equal to or less than the first constant value. Impedance of D1 may be adjusted to make an imaginary component of a Y21 parameter be equal to or less than the second constant value.

Thus, according to an embodiment of the present disclosure, an antenna device having isolation equal to or greater than 30 dB at a broadband frequency of f_1 to f_n may be designed.

When the multi-stage decoupling network circuit is used, impedance matching of the antenna may be degraded (no longer 50Ω). When impedance matching of the antenna is adversely affected due to D1, impedance may be matched to 50 Ω again using a shunt stub. The shunt stub used for impedance matching may not affect a Y21 value. Because port 2 is shorted during a process of deriving a Y parameter between ports even if the shunt stub is connected, the shunt stub connected to port 2 may not be deemed to present. That is, the shunt stub may not change the magnitude of current flowing in port 2, and thus may not affect a value of a Y21 parameter.

When the antenna device according to an embodiment of the present disclosure is used, a real value of Y21 may be limited to a specific range (0.001 based on isolation of −30 dB) in order to obtain high cross-talk isolation at a wide frequency band and an imaginary value of Y21 may be made to 0 in an entire frequency range. To this end, a multi-stage decoupling network structure in which two or more decoupling networks not one decoupling network are cascaded may be used. A decoupling network configuring the multi-stage decoupling network may be designed by checking Y21 frequency characteristic for each reference plane rather than being separately designed.

Figure 15:
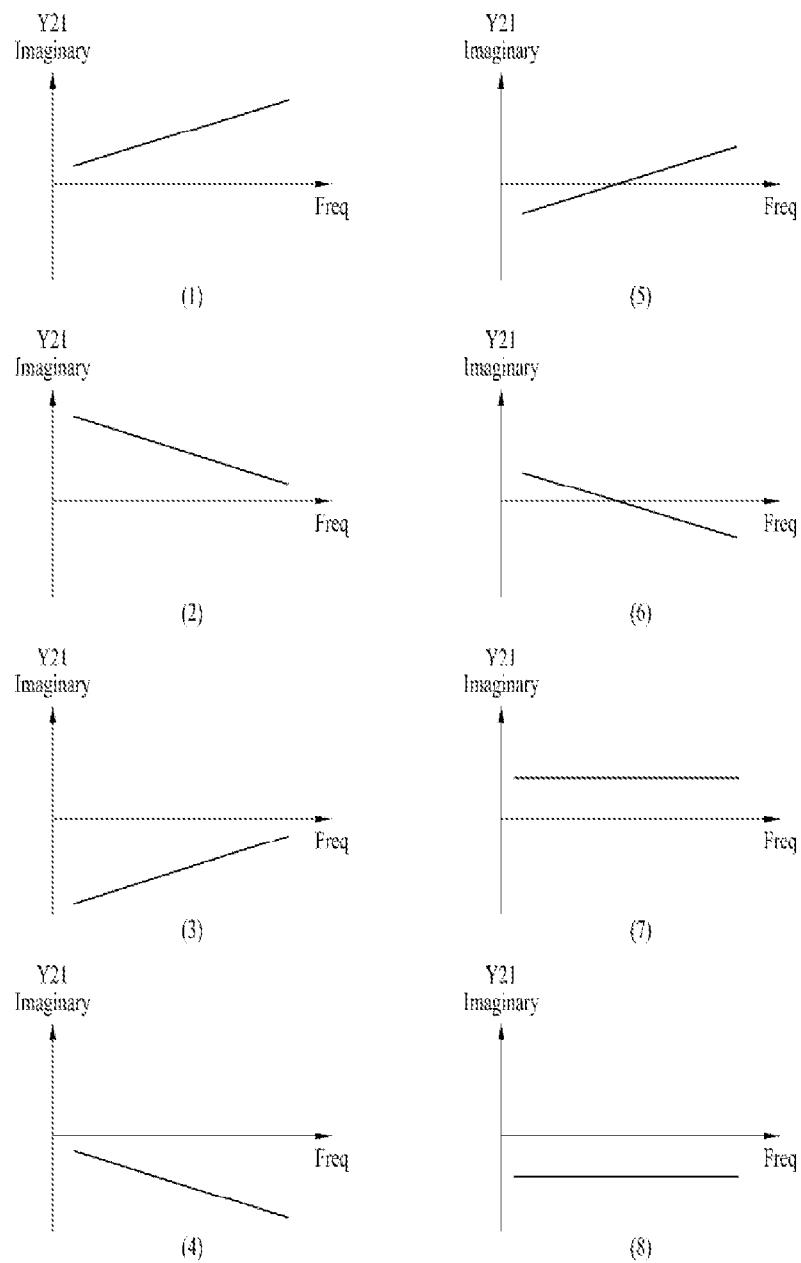
FIG. 15 is a diagram showing an example of various forms of an imaginary value of Y21 depending on a frequency.

FIG. 15 is a diagram showing an example of various forms of an imaginary value of Y21 depending on a frequency. As exemplified in FIG. 15, the imaginary value of Y21 may be changed in various forms depending on a change in frequency.

Figure 16:
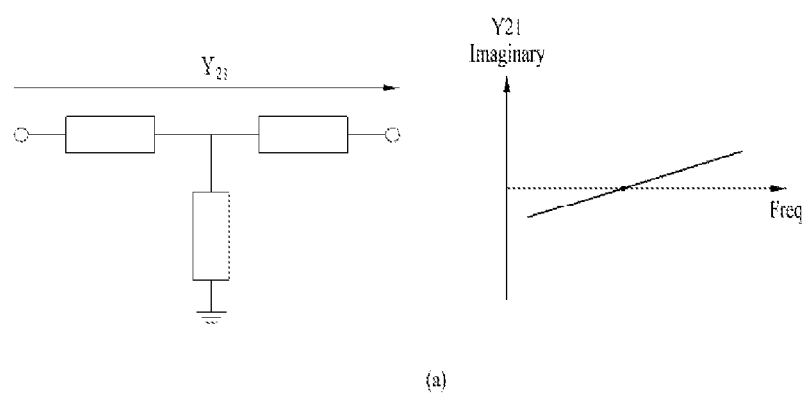
FIG. 16 is a diagram showing examples of the decoupling circuit D1 according to an embodiment of the present disclosure.
Figure 16:
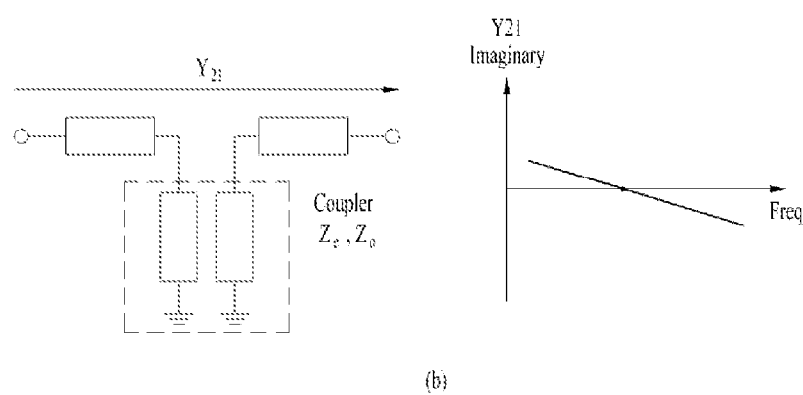

FIG. 16 is a diagram showing examples of the decoupling circuit D1 according to an embodiment of the present disclosure.

The decoupling circuit D1 of the antenna device according to an embodiment of the present disclosure needs to show various changed forms of the imaginary value of Y21 shown in FIG. 15. That is, the decoupling circuit that shows the various changed forms may be required for all cases of FIG. 15. When the decoupling circuit D1 is embodied using a single transmission line, the forms of (1), (2), (3), (4), (7), and (8) of FIG. 15 may be represented in a wide frequency band. However, the decoupling circuit embodied based on the single transmission line may not represent (5) and (6), that is, the case in which zero-crossing occurs.

The decoupling circuit D1 of the present disclosure may be embodied in the form shown in FIG. 16.

Referring to FIG. 16(a), the decoupling circuit D1 may be designed as a T-shaped structure. An imaginary value of Y21 of this structure may be increased through zero-crossing as a frequency increases. The T-shaped structure may have two resonance frequencies as a dual mode resonator. The positions of the two resonance frequencies and a resonance degree (a degree by which the imaginary value of Y21 is changed near the resonance frequency) may be adjusted to change a shape of the imaginary value of Y21 in various ways in a wide frequency band.

The resonance frequency may be changed by changing the lengths of the first transmission line and the second transmission line, and the resonance degree may be adjusted by adjusting characteristic impedance of each transmission line.

Referring to FIG. 16(b), the decoupling circuit D1 may be designed to include a coupled line. In the decoupling circuit, a 3 dB coupler with ground located on both a through port (hereafter, Thru) and an isolation port may be used, which is a type of an all stop filter. When the all stop filter and the transmission line are used, the imaginary value of Y21 may decrease through zero-crossing depending on a frequency. When both the Thru and the isolation port of the coupled line are shorted, a port on which a signal is incident and a coupled port may be open to each other. The imaginary value of Y21 may decrease through zero-crossing using the circuit characteristic whereby a circuit is open at a central frequency.

Figure 17:
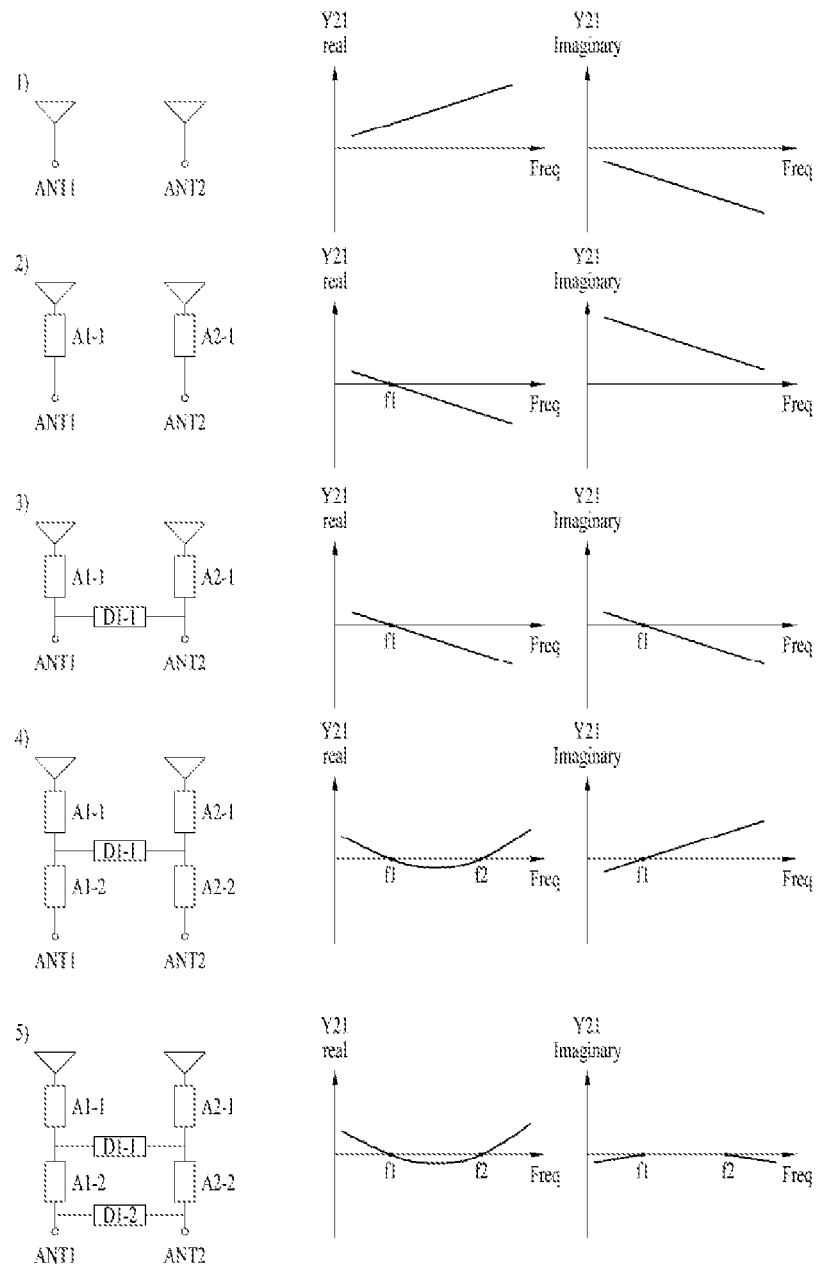
FIGS. 17, 18, and 19 are diagrams showing a concept of adjusting a value of a Y21 parameter depending on a frequency in a multi-stage decoupling network.
Figure 18:
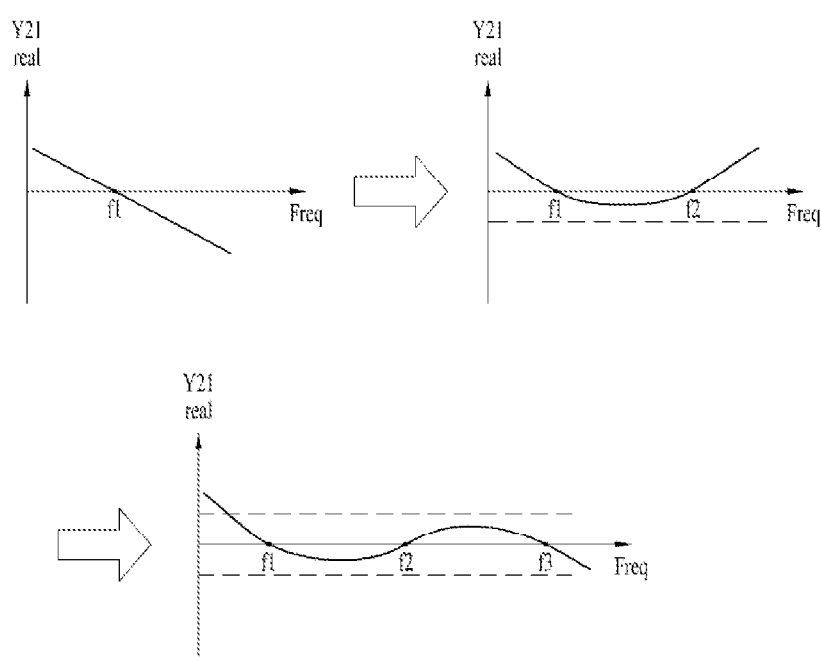
Figure 19:
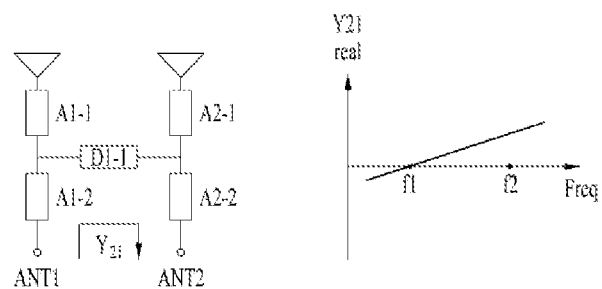
Figure 19:
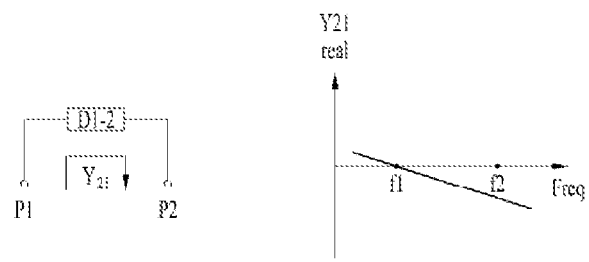
Figure 19:
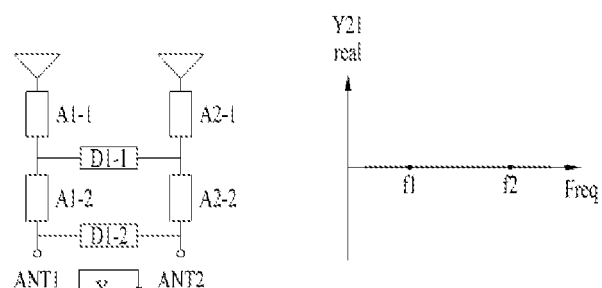

FIGS. 17, 18, and 19 are diagrams showing a concept of adjusting a value of a Y21 parameter depending on a frequency in a multi-stage decoupling network.

In FIG. 17, as a transmission line and decoupling circuits are connected, Y21 parameters may be changed. When values of an antenna device are adjusted depending on a decoupling network and a frequency, the Y21 parameter of the antenna device may be made be equal to or less than a constant value.

FIG. 18 is a diagram for explaining a method of making a real component of a Y21 parameter be equal to or less than a constant value at each of frequencies f_1, . . . , and f_n using connection single decoupling network circuits. A circuit may be set to make a real component of Y21 of the first stage single decoupling network circuit be 0 at f_1. Then, the second stage single decoupling network circuit may be cascaded with the first stage single decoupling network circuit to make a real component of Y21 of the coupled circuit be 0 at f_2. Here, when a value of Y21 is 0, this means that the current state is the state in which two ports are not already connected (open state) at a frequency f_1, and thus even if a reference plan of a Y-parameter is changed using the transmission lines A1_2 and A2_2 of the second stage single decoupling network circuit, a value of Y21 may not be changed. A real value of Y21 at two frequencies f_1 and f_2 may be made to 0 to limit a range of the real value of Y21. Making the real value of Y21 at the two frequencies to 0 may ensure that the real value of Y21 does not deviate from a predetermined magnitude in a specific frequency band (here, f_1 to f_2). This has the same basic principle as increase in a degree of a function, and as the method is repeated, the real value of Y21 in a frequency band may be limited to a specific range (|real(Y21 (f))|<a, when f_1≤f≤f_2, "a" being an arbitrary value).

FIG. 19 is a diagram showing operation 5) of FIG. 17 in more detail. Referring to FIG. 19, when an antenna circuit of FIG. 19(a) and an antenna circuit of FIG. 19(b) are connected, values of respective Y21 parameters may be summed and a value of a Y21 parameter of an antenna circuit of FIG. 19(c) may be close to 0. The circuit of FIG. 19(a) and the circuit of FIG. 19(b) may be connected to the same terminals ANT1 and ANT2 in FIG. 19(c), and thus may be deemed to be connected in parallel. Y parameters of circuits connected in parallel in a 2 port circuit may be summed. Thus, a value of the Y21 parameter of FIG. 19(c) may be represented as the sum of the value of the Y21 parameter of FIG. 19(a) and the value of the Y21 parameter of FIG. 19(b). Accordingly, when device values are adjusted/set to make a Y21 parameter be equal to or less than a constant value during a cascade of a multi-stage decoupling network circuit, an antenna device that also satisfies self-interference cancellation requirements in a broadband may be manufactured.

Figure 20:
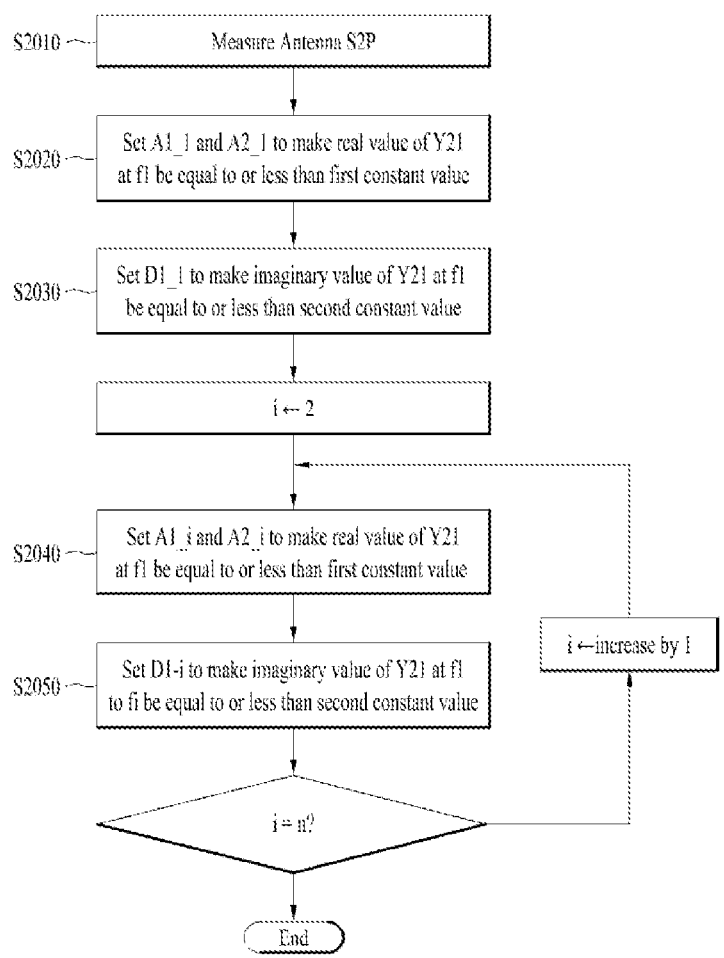
FIG. 20 is a flowchart of design of an antenna device according to the present disclosure.

FIG. 20 is a flowchart of design of an antenna device according to the present disclosure.

First, coupling (S-parameter) between antennas may be measured to manufacture a decoupling network (S2010).

Second, the electrical length of the transmission lines A1_1 and A2_1 may be adjusted to make a real value of Y21 at f_1 be equal to or less than a first constant value (S2020). A real value of Y21 of an ideal inductor, capacitor, resonator, and transmission line may not be made to 0. Loss need to be present in order to change the real value of Y21 by the decoupling circuit D1 that connects two ports, and in this regard, when conventionally used devices (Inductor/Capacitor/Transmission line) are ideal, loss may not be present, and thus the real value of Y21 may not be affected. Thus, only A1_1 and A2_2 may make the real value of Y21 to 0. Characteristic impedance of A1_1 and A2_1 may use 50 Ω. Although it is possible to use other impedance, 50 Ω may be used in order to have a minimal effect on antenna impedance matching.

In the present disclosure, making a value of Y21 zero may include making the value be equal to or less than a constant value.

Third, D1_1 may be set to make an imaginary value of Y21 at f_1 be equal to or less than the second constant value (S2030). In the case of the first stage, D1 is not particularly limited, and it may also be possible to use a single transmission line. Through operations S1810 and S1820, a value of Y21 at f_1 may be made to 0 (both real and imaginary values of Y21 are 0).

Fourth, A1_2 and A2_2 may be set to make a real value of Y21 at f_2 be equal to or less than the first constant value (S2040). When a value of Y21 is 0, this means that the current state is the state in which two ports are not already connected (open state) at a frequency f1, and thus even if a reference plan of a Y-parameter is changed using the transmission lines A1_2 and A2_2, a value of Y21 may not be changed. A real value of Y21 at two frequencies f1 and f2 may be made to 0 to limit a range of the real value of Y21. Making the real value of Y21 at the two frequencies to 0 may ensure that the real value of Y21 does not deviate from a predetermined magnitude in a specific frequency band (here, f1 to f2). This has the same basic principle as increase in a degree of a function, and as the method is repeated, the real value of Y21 in a frequency band may be limited to a specific range (|real(Y21 (f)|<a, when f1≤f≤f2, "a" being an arbitrary value).

Fifth, D1_2 may be set to make an imaginary value of Y21 at f_1 to f_2 be equal to or less than the second constant value (S2050). D1_2 may be used to imitate a shape of the imaginary value of Y21 at frequencies f_1 to f_2. Imitating the shape of Y21 means that D1_2 creates an imaginary value of Y21, which has the same magnitude and opposite sign as the imaginary value of the Y21 viewed from the antenna port. A circuit used as D1_2 may be embodied in various forms such as an inductor, a capacitor, or a transmission line. In addition, D1_2 may be embodied in the form of FIG. 16. The imaginary value of Y21 may have various forms shown in FIG. 15. A broadband decoupling network may be manufactured when it is possible to imitate all the shapes using the circuit used in D1. When a structure using a T-shaped structure and a Coupled line shown in FIG. 15 is selected and used depending on frequency characteristic, all shapes proposed in FIG. 15 may be imitated, and the imaginary value of Y21 may be made to 0 in a wide frequency band (f1 to f2) using the imitated shapes.

Sixth, the above process may be repeated several times to design a broadband decoupling network. When the decoupling networks are cascaded in multiple stages, antenna impedance matching may be degraded. Degradation of antenna impedance matching means that an impedance matching frequency band of an antenna to which a decoupling network is added is reduced compared with an impedance matching frequency band of only an antenna. For example, when the impedance matching frequency band of only an antenna is 1 GHz, the impedance matching frequency band of the antenna to which the decoupling network is added may be reduced to 500 MHz.

In order to match impedance of an antenna, which deviates from 50Ω, to 50 Ω again, a shunt stub S1 (separate from D1) may be used. An operating frequency band of an antenna may be defined based on various factors (impedance matching, cross-talk suppression, antenna gain, etc.).

A design method is summarized as follows. A degree of change in a real value of Y21 depending on a frequency may be limited using A1 and A2 (transmission lines of 50Ω). A shape of the imaginary value of Y21 in a frequency band may be imitated using the proposed D1 (the structure using the T-shaped structure or the Coupler), and thus the imaginary value of Y21 at a wide frequency band may be made to 0. Through the two processes, a value of Y21 in an operating frequency band may be close to 0, which is interpreted as having high cross-talk suppression.

The lastly changed impedance of the antenna may be matched to 50 Ω again using shunt stubs S1 and S2, and thus a decoupling network having high cross-talk suppression and impedance matching in a broadband may be designed.

The designed antenna and decoupling network may be combined with a reflection coefficient controller (RCC), and thus an antenna device for FDR having high cross-talk and self-talk suppression in a wide frequency band may be manufactured.

Here, the RCC may be a circuit connected to a port in which a circulator is connected to an antenna and may refer to a circuit for increasing isolation between ports of a commercial circulator by changing impedance of the antennas.

Figure 21:
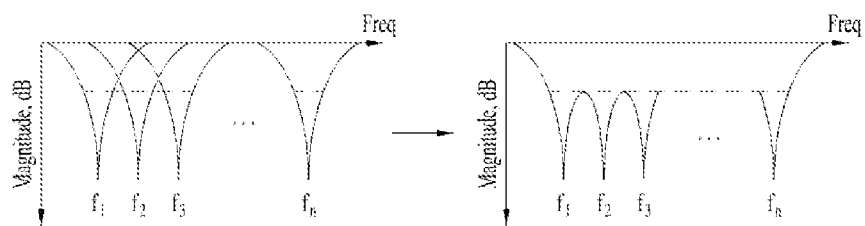
FIG. 21 is a diagram showing an example of a broadband decoupling effect according to an embodiment of the present disclosure.

FIG. 21 is a diagram showing an example of a broadband decoupling effect according to an embodiment of the present disclosure.

According to an embodiment of the present disclosure, a circuit may be designed to make a value of a Y21 parameter be equal to or less than a constant value at each of frequencies f_1, . . . , and f_n, and thus a broadband decoupling network circuit having a decoupling effect at a frequency f_1 to f_n may be designed.

Figure 22:
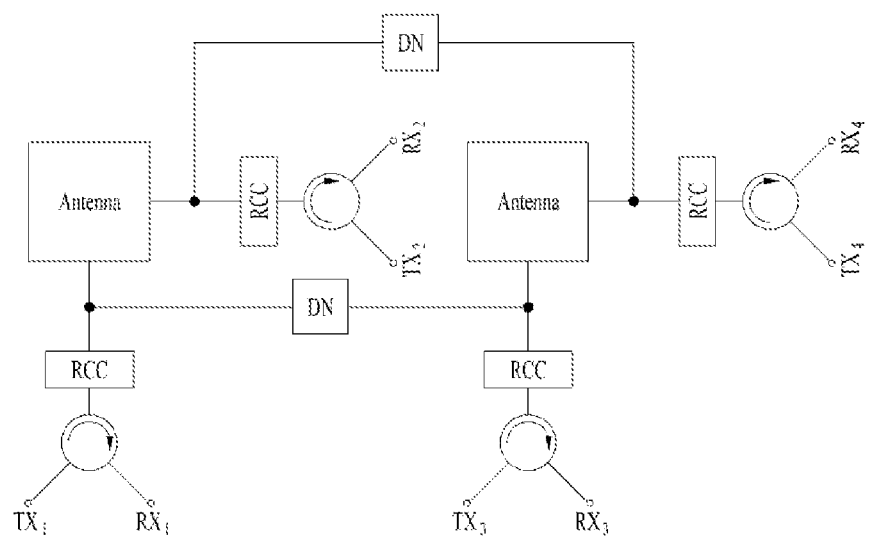
FIGS. 22 and 23 are diagrams showing an example of an antenna device according to an embodiment of the present disclosure.

FIG. 22 is a diagram showing an example of an antenna device according to an embodiment of the present disclosure.

Referring to FIG. 22, the antenna device according to an embodiment of the present disclosure may be embodied based on a 4×4 MIMO antenna structure using a decoupling network, an RCC, and antenna polarization. For cross-talk suppression, the decoupling network and the antenna polarization may be used, and for self-talk cancelation, the RCC may be used. According to an embodiment of the present disclosure, when multiple printed circuit board technology is used, the present disclosure may also be applied to more MIMO antenna structures.

FIG. 23 is a diagram showing an antenna device according to an embodiment of the present disclosure.

FIG. 23 shows an antenna device including a multi-stage decoupling network circuit including first stage and second stage single decoupling network circuits.

The first stage single decoupling network circuit may embodied as D1 based on a single transmission, and the second stage single decoupling network circuit may be embodied as D1 using a coupler. A shunt stub may be connected to the second stage single decoupling network circuit.

FIG. 24 is a diagram showing an example of an isolation graph depending on a frequency based on an antenna device according to an embodiment of the present disclosure.

As seen from FIG. 24, a 2-stage multi-stage decoupling circuit may have isolation in a broadband compared with a single decoupling network circuit.

Figure 25:
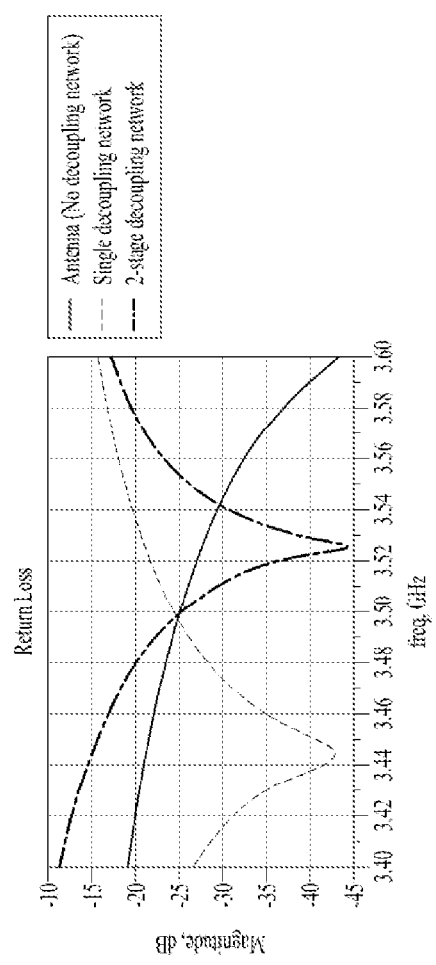
FIG. 25 is a diagram showing return loss depending on a frequency based on an antenna device according to an embodiment of the present disclosure.

FIG. 25 is a diagram showing return loss depending on a frequency based on an antenna device according to an embodiment of the present disclosure.

As seen from FIG. 25, return loss refers to a matching degree. It may be seen that, comparing return loss of an antenna to which a decoupling network is not connected and an antenna to which a decoupling network is connected, the decoupling network does not adversely affect matching of an antenna.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the disclosure may be carried out in other specific ways than those set forth herein without departing from the spirit and essential characteristics of the disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A device comprising:
a transceiver including (i) a first antenna having a first antenna module, a first antenna port, and a first transmission line between the first antenna module and the first antenna port, (ii) a second antenna having a second antenna module, a second antenna port, and a second transmission line between the second antenna module and the second antenna port, and (iii) a plurality of decoupling network (DN) circuits; and
a processor configured to control the transceiver to transmit or receive wireless signals based on full duplex radio (FDR),
wherein, in at least one frequency, a ratio value between a voltage of the first antenna port and a specific current of the second antenna port is non-zero in at least one of the plurality of DN circuits,
wherein a real component of the ratio value is configured not to exceed a first threshold value based on a length of the first transmission line and a length of the second transmission line,
wherein the specific current of the second antenna port used for calculating the ratio value excludes a non-zero current of the second antenna module, and
wherein a sum of all ratio values of the plurality of DN circuits is zero for any frequency to cancel FDR-related self-interference between the first antenna and the second antenna.

2. The device of claim 1, wherein each of the plurality of DN circuits includes:
a first node;
a second node connected to the first node through the first transmission line;
a third node; and
a fourth node connected to the third node through the second transmission line,
wherein the second node and the fourth node are connected through a third transmission line including a decoupling circuit.

3. The device of claim 2, wherein the first node of a second DN circuit is connected to the second node of a first DN circuit, and
the third node of the second DN circuit is connected to the fourth node of the first DN circuit.

4. The device of claim 2, wherein the decoupling circuit in the third transmission line is configured to make an imaginary component of the ratio value to be equal to or less than a second constant value.

5. The device of claim 2, wherein the decoupling circuit is formed in a T-shaped structure.

6. The device of claim 2, wherein the decoupling circuit includes a coupler.

7. The device of claim 2, wherein each of the plurality of DN circuits includes:
a first shunt stub having one end connected to the second node and a remaining end grounded; and
a second shunt stub having one end connected to the fourth node and a remaining end grounded.

8. The device of claim 1, wherein the plurality of DN circuits have different frequencies in which the ratio value becomes smaller than a threshold.

9. The device of claim 1, wherein the plurality of DN circuits are cascaded with each other.

10. The device of claim 9, wherein a multi-stage decoupling network circuit is configured based on the plurality of DN circuits.

* * * * *